United States Patent [19]
Abe

[11] Patent Number: 5,297,753
[45] Date of Patent: Mar. 29, 1994

[54] TAPE CASSETTE

[75] Inventor: Masanori Abe, Miyagi, Japan

[73] Assignee: Sony Corporation, Tokyo, Japan

[21] Appl. No.: 701,041

[22] Filed: May 16, 1991

[30] Foreign Application Priority Data

May 21, 1990 [JP] Japan .................................. 2-130751

[51] Int. Cl.5 ............................................ G11B 23/08
[52] U.S. Cl. .................................................. 242/198
[58] Field of Search ............... 242/197, 198, 199, 200;
360/132; 206/387, 389

[56] References Cited

U.S. PATENT DOCUMENTS

| 3,520,495 | 7/1970 | Sotani | 242/192 |
| 3,526,371 | 9/1970 | Blackie et al. | 242/200 |
| 4,226,386 | 10/1980 | Rubi | 242/192 |
| 4,369,935 | 1/1983 | Yamanaka | 242/200 X |
| 5,044,794 | 9/1991 | Shimoyama et al. | 242/192 X |

FOREIGN PATENT DOCUMENTS 2842447 4/1980 Fed. Rep. of Germany ...... 242/192

58-128068 7/1983 Japan .................................. 360/132
60-171684 9/1985 Japan .
63-122964 8/1988 Japan .

Primary Examiner—Daniel P. Stodola
Assistant Examiner—John P. Darling
Attorney, Agent, or Firm—Lewis H. Eslinger; Jay H. Maioli

[57] ABSTRACT

In a short-time recording tape cassette having a mouth section for receiving a head drum, a pair of tape reels can be moved to a rear portion in a cassette case of the tape cassette upon loading of the tape cassette into a recording/reproducing device, thereby eliminating a dead space in the cassette case and further expanding the mouth section. Accordingly, a more compact construction of the recording/reproducing device can be realized. Moreover, a spring for biasing the tape reels is configured in a substantially S-shaped cross section, so as to make a biasing force of the spring against the tape reels before the movement of the tape reels substantially equal to that after the movement of the tape reels.

8 Claims, 12 Drawing Sheets

TAPE CASSETTE

BACKGROUND OF THE INVENTION

The present invention relates to a tape cassette for use with a magnetic recording/reproducing device such as a video tape recorder, and more particularly to a short-time recording tape cassette including a small-diameter roll of a magnetic tape to permit a compact construction of the recording/reproducing device.

In a conventional tape cassette for use with a magnetic recording/reproducing device such as a video tape recorder (VTR), it has been proposed that a roll diameter of a magnetic tape contained in a cassette case of the tape cassette is reduced to define a large mouth section for receiving a head drum, thereby making the recording/reproducing device compact. Such a tape cassette is called a short-time recording tape cassette (as disclosed, for example, in Japanese Patent Laid-open Publication No. 60-171684 or Japanese Utility Model Application No. 62-14573 filed by the present assignee).

Figure 15:
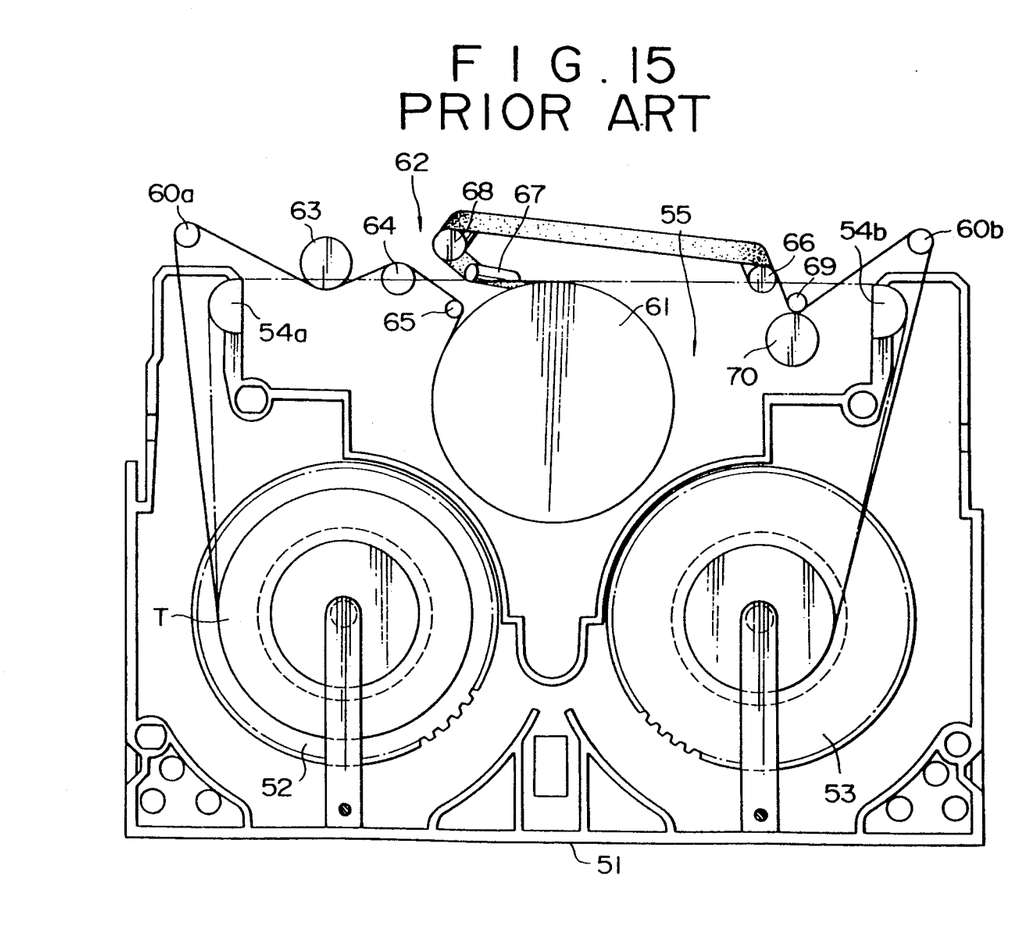
FIG. 15 is a top plan view of the tape cassette in the prior art.

Such a conventional short-time recording tape cassette will be schematically described with reference to FIG. 15. Referring to FIG. 15 which is a top plan view of the tape cassette with an upper half thereof removed, reference numeral 51 generally designates a cassette case accommodating a pair of rotatable tape reels 52 and 53 around which a magnetic tape T is wound. A pair of semicolumnar tape guides 54a and 54b are provided at left and right front end portions of the cassette case 51. The magnetic tape T is guided through the tape guides 54a and 5b, and is exposed to a front opening of the cassette case 51 under a stretched condition as shown by a chain line. Further, a bottom wall of the cassette case 51 is largely recessed from its front end, so as to form a mouth section (opening) 55 between and front of both the tape reels 52 and 53.

In the tape cassette as constructed above, a diameter of each of the tape reels 52 and 53 is smaller than that of tape reels in a normal tape cassette as standardized. Accordingly, the mouth section 55 is larger in size than that in the normal tape cassette by an amount corresponding to the reduced diameter of the tape reels 52 and 53.

In the operation of this tape cassette, the magnetic tape T is drawn out frontward by a pair of draw-out guides 60a and 60b provided in the recording/reproducing device. Simultaneously, a head drum 61 and a tape running unit 62 (inclusive of an impedance roller 63, tape guides 64, 65 and 66, loading posts 67 and 68, capstan 69, pinch roller 70, etc.) provided in the recording/reproducing device are inserted into the mouth section 55. Under this condition, the magnetic tape T exposed at the front opening of the cassette case 51 is wound around the head drum 61 as shown by a solid line (i.e., loaded condition), thus carrying out a recording or reproducing operation.

According to this construction, as the size of the mouth section 55 is made larger by a reduced diameter of each of the tape reels 52 and 53, the head drum 61 and the like can be deeply inserted into the cassette case 51, thereby advantageously contributing to the compactness of the recording/reproducing device.

However, in the conventional short-time recording tape cassette, the enlargement of the mouth section is effected merely by reducing the diameter of each tape reel. Accordingly, the size of the mouth section can only be made so large, causing a limitation of the compactness of the magnetic recording/reproducing device.

As to an internal structure of this conventional short-time recording tape cassette, there is a dead space on the lateral and rear sides of the tape reels in the cassette case. That is, the whole space in the cassette case is not effectively utilized.

Further, in general, such a tape cassette employs a reel presser spring for biasing the tape reels, and it is necessary to maintain the biasing force of the spring against the tape reels at a substantially constant value, so as to stabilize rotation of the tape reels.

SUMMARY OF THE INVENTION

It is accordingly an object of the present invention to provide a tape cassette which can further expand the mouth section by effectively utilizing the space in the cassette case.

It is another object of the present invention to provide a tape cassette which can maintain the biasing force of the reel presser spring to be applied against the tape reels at a substantially constant value during the operation.

According to the present invention, there is provided a tape cassette comprising a cassette case; a pair of rotatable tape reels accommodated in said cassette case for winding a magnetic tape therearound, said tape reels having a relatively small diameter; a mouth section formed between and in front of said tape reels in said cassette case for receiving a head drum and the like of a recording/reproducing device; means for allowing movement of said tape reels to a rear portion of said cassette, whereby when said tape cassette is loaded into said recording/reproducing device, said tape reels are moved to the rear portion of said cassette case, thereby expanding said mouth section; and a spring for biasing said tape reels, said spring having a substantially S-shaped cross section, so as to make a biasing force of said spring against said tape reels before the movement of said tape reels substantially equal to that after the movement of said tape reels.

With this construction, when the tape cassette is in an inoperative condition, the tape reels are located at a normal position compatible with that in a standardized normal tape cassette. Under this condition, the size of the mouth section is not so large, and the tape cassette can be loaded into a standard recording/reproducing device with the tape reels maintained at the normal position. On the other hand, when the tape cassette is loaded into a dedicated recording/reproducing device, the tape reels are moved or retracted to the rear corner portions in the cassette case to thereby widely expand the mouth section. Accordingly, the head drum and the like can be more deeply inserted into the mouth section and be completely received therein. As a result, it is very advantageous from the standpoint of more compact construction of the recording/reproducing device.

Furthermore, since the biasing force of the spring applied to the tape reels before the movement of the tape reels is made substantially equal to that after the movement of the tape reels, the rotation of the tape reels can be stabilized.

Other objects and features of the invention will be more fully understood from the following detailed description and appended claims when taken with the accompanying drawings.

DETAILED DESCRIPTION OF THE PREFERRED EMBODIMENT

There will now be described a preferred embodiment of the present invention with reference to the drawings.

Referring to FIGS. 1 to 14, reference numeral 1 generally designates a cassette case consisting of an upper half 2 and a lower half 3 combined together by screws or the like.

The external shape, size, etc. of the cassette case 1 are in accordance with an 8 mm video standard which is a world unified standard.

A pair of tape reels 4 and 5 each winding a magnetic tape T therearound are rotatably accommodated in the upper half 2 and the lower half 3 of the cassette case 1. The magnetic tape T wound around the tape reels 4 and 5 is partially disposed at a front opening of the cassette case 1 under tension as stretched between a pair of roller guides 6a and 6b provided at left and right front end portions of the lower half 3, respectively.

The tape reels 4 and 5 are comprised of hubs 4a and 5a around which the magnetic tape T is wound, upper flanges 4b and 5b and lower flanges 4c and 5c for defining upper and lower wound surfaces of the magnetic tape T, respectively. Bottom surfaces of the tape reels 4 and 5 are formed at central portions thereof with open holes 4d and 5d adapted to engage reel shafts (not shown) provided in a recording/reproducing device (not shown), respectively. Diameters of the upper and lower flanges 4b and 4c of the tape reel 4 and diameters of the upper and lower flanges 5b and 5c of the tape reel 5 are smaller than those of a standard tape cassette. Accordingly, a length of the magnetic tape T to be wound around the tape reels 4 and 5 is smaller than that in the standard tape cassette (i.e., a recordable or reproducible time of the magnetic tape T is about 30–60 minutes, for example, in this preferred embodiment).

The tape reels 4 and 5 are movable in the cassette case 1 between a normal position specified by the 8 mm video standard and a retracted position defined at rear corner portions of the cassette case 1.

A moving mechanism for the tape reels 4 and 5 is constructed as follows:

A bottom wall of the lower half 3 is formed with a cutout 7 largely expanding rearwardly from the front opening of the cassette case 1 where the magnetic tape T is stretched between the roller guides 6a and 6b. A pair of reel retainers 8 and 9 for respectively rotatably supporting the tape reels 4 and 5 are provided in the cassette case 1 so as to be disposed over the cutout 7. The reel retainers 8 and 9 are swingably supported to a pair of pivotal shafts 10 and 11 at left and right end portions in the cassette case 1, respectively, so that the reel retainers 8 and 9 can swing about the pivotal shafts 10 and 11 in front and rear directions of the cassette case 1. The reel retainers 8 and 9 are comprised of bottom wall portions 8a and 9a on which the tape reels 4 and 5 are placed, and standing wall portions 8b and 9b so formed as to surround front to inner sides of the tape reels 4 and 5, respectively. The bottom wall portions 8a and 9a are formed with reel retaining holes 8c and 9c, respectively. On the bottom surfaces of the tape reels 4 and 5, there are formed annular projections 4e and 5e around opening edges of the open holes 4d and 5d, respectively. The annular projections 4e and 5e of the tape reels 4 and 5 are loosely engaged with the reel retaining holes 8c and 9c of the reel retainers 8 and 9, respectively.

A mouth section 12 for receiving a head drum and the like (to be hereinafter described) provided in the recording/reproducing device is formed by an intermediate space defined between the standing wall portions 8b and 9b of the reel retainers 8 and 9 and by a recessed space defined before the intermediate space. A size of the mouth section 12 is made variable by swinging the reel retainers 8 and 9 and accordingly moving the tape reels 4 and 5 together with the reel retainers 8 and 9.

The bottom wall of the lower half 3 is further formed with a pair of recesses 7a and 7b continued from the cutout 7 so as to correspond to the reel retaining holes 8c and 9c of the reel retainers 8 and 9 and trace a locus of swing motion of the reel retainers 8 and 9, respectively.

The bottom wall portions 8a and 9a of the reel retainers 8 and 9 are partially exposed from the cutout 7 of the lower half 3 to a bottom outer surface of the lower half 3, and such exposed surfaces of the bottom wall portions 8a and 9a are utilized as a reference surface for positioning upon loading the tape cassette 1 into the recording/reproducing device. Therefore, a part of the bottom wall portions 8a and 9a not interfering with the lower half 3 upon swinging the reel retainers 8 and 9 (i.e., a hatched part shown in FIG. 6) is formed as a projected flat surface flush with the bottom outer surface of the lower half 3.

A pair of roller guides 13a and 13b are rotatably mounted on the pivotal shafts 10 and 11 as the centers of swing motion of the reel retainers 8 and 9, respectively. The magnetic tape T wound around the tape reels 4 and 5 is guided through the roller guides 13a and 13b to the front roller guides 6a and 6b, and is exposed to the front opening of the cassette case 1.

Further, a pair of detection holes 14 are formed through opposite side walls of the lower half 3, and a pair of detection holes 15 are also formed through the standing wall portions 8b and 9b of the reel retainers 8 and 9. These detection holes 14 and 15 serve to allow passage of a detection light for detecting top/end of the magnetic tape T.

A pair of reel presser springs 16 and 17 each formed as a leaf spring are mounted on a back surface of the top wall of the upper half 2 at two positions corresponding to the tape reels 4 and 5, respectively. The reel presser springs 16 and 17 are comprised of arm portions 16a and 17a fixed at their base ends to the upper half 2 and presser portions 16b and 17b continued from front ends of the arm portions 16a and 17a for pressing central projections 4f and 5f of the tape reels 4 and 5, respectively. The presser portions 16b and 17b have an arcuate shape tracing a locus of movement of the tape reels 4 and 5 to be moved by the reel retainers 8 and 9.

A lock mechanism 18 for locking the tape reels 4 and 5 and the reel retainers 8 and 9 is provided at a rear central portion in the cassette case 1.

The lock mechanism 18 is constructed as follows:

A guide portion 19 is formed at a rear central portion of the lower half 3, and a lock member 20 is provided at the rear central portion of the cassette case 1 so as to be movable along the guide portion 19 in the front and rear directions of the cassette case 1. The lock member 20 is formed at its left and right ends with a pair of pawls 21a and 21b projecting frontward.

The reel retainers 8 and 9 are recessed at their rear ends to form a pair of engagement grooves 22a and 22b adapted to engage the pawls 21a and 21b, respectively. Furthermore, the lower flanges 4c and 5c of the tape reels 4 and 5 are formed at their entire outer circumferences with a plurality of engagement teeth 23a and 23b adapted to engage the pawls 21a and 21b, respectively.

A compression coil spring 24 is interposed between the lock member 20 and a rear side wall of the lower half 3. Accordingly, the lock member 20 is normally biased by a biasing force of the compression coil spring 24 in the frontward direction such that the pawls 21a and 21b engage both the engagement grooves 22a and 22b of the reel retainers 8 and 9 and the engagement teeth 23a and 23b of the tape reels 4 and 5, respectively.

The lock member 20 is formed at its central portion with an operation hole 20a, while the bottom wall of the lower half 3 is formed with a through hole 25 directly communicating with the operation hole 20a. Accordingly, when the tape cassette in this preferred embodiment is loaded into a standard recording/reproducing device as will be hereinafter described, a first unlocking member (not shown) provided in the standard recording/reproducing device is inserted through the through hole 25 into the operation hole 20a of the lock member 20, and the lock member 20 is moved rearwardly by the first unlocking member to thereby unlock the tape reels 4 and 5.

Further, the bottom wall of the lower half 3 is formed with a recess 26 extending from a rear edge of the cutout 7 to a position in front of the through hole 25. Accordingly, when the tape cassette in this preferred embodiment is loaded into a dedicated recording/reproducing device as will be hereinafter described, a second unlocking member (not shown) provided in the dedicated recording/reproducing device is inserted through the recess 26, and a front end surface 20b of the lock member 20 is urged rearwardly by the second unlocking member to thereby unlock the reel retainers 8 and 9.

At the front end portion of the cassette case 1 is pivotably mounted a front lid 28 for protecting a front surface of the magnetic tape T stretched between the front roller guides 6a and 6b.

The front lid 28 has a pair of side wall portions 28a and 28b extending rearwardly from left and right ends of the lid 28. A pair of pivot pins 29 project inwardly from inner surfaces of the side wall portions 28a and 28b, respectively, while a pair of pin holes 30 are formed through opposite side walls of the upper half 2 so as to correspond to the pivot pins 29. Accordingly, the front lid 28 is vertically rotatably supported to the upper half 2 by loosely inserting the pivot pins 29 into the pin holes 30. Further, a torsion spring 31 is mounted on either of the pivot pins 29, so that the front lid 28 is normally biased by the torsion spring 31 in a closing direction of the lid 28 so as to cover the front surface of the magnetic tape T. When the tape cassette is loaded into the recording/reproducing device, the front lid 28 is opened upwardly by a lid opening mechanism (not shown) provided in the recording/reproducing device, and the magnetic tape T is accordingly exposed from the front lid 28.

Further, a back lid 32 for protecting a back surface of the magnetic tape T is provided behind the front lid 28.

The back lid 32 is comprised of a back lid body 33 for covering the back surface of the magnetic tape T and a top plate 34 for closing a recess 2a formed through the top wall of the upper half 2 which recess 2a serves as an escape space for allowing escape of the back lid body 33 when it is opened. The back lid body 33 and the top plate 34 are integrally connected with each other through a pair of connecting portions 35.

The back lid body 33 is formed at its right and left ends with a pair of pivot pins 36, while a pair of supporting members 37 project from a back surface of the front lid 28. The pivot pins 36 of the back lid body 33 are pivotably supported to the supporting members 37 of the front lid 28. Accordingly, the back lid 32 is rotatably connected to the front lid 28.

Further, the top plate 34 of the back lid 32 is formed at its right and left ends with a pair of arms 41 projecting downwardly, and with a pair of engagement pins 38 projecting outwardly from the arms 41 at the lower ends thereof. On the other hand, a pair of guide walls 39 are so formed as to project upwardly at right and left front portions of the lower half 3 at two positions behind the front roller guides 6a and 6b. The guide walls 39 are formed with a pair of cam grooves 40 having a predetermined profile for engaging the engagement pins 38 of the top plate 34 of the back lid 32. Accordingly, while the front lid 28 being rotated to be opened or closed, the engagement pins 38 are guided along the cam grooves 40, thereby opening or closing the back lid 32 in association with the rotation of the front lid 28.

Additionally, the tape cassette in this preferred embodiment has a special construction such that even after the head drum and the like are inserted into the mouth section 12 upon loading of the tape cassette into the recording/reproducing device to draw the magnetic tape T into the mouth section 12, the front lid 28 can be closed again.

That is, a pair of gaps "a" for allowing passage of the magnetic tape to be drawn into the mouth section 12 defined at the right and left ends of the back lid 32 in the tape cassette. More specifically, as mentioned previously, the arms 41 project downwardly from the right and left ends of the top plate 34 of the back lid 32, and the engagement pins 38 are formed at the lower ends of the arms 41. Thus, there is defined a predetermined gap "a" between the right arm 41 and the right end of the back lid body 33, and there is also defined a predetermined gap "a" between the left arm 41 and the left end of the back lid body 33. As the magnetic tape (shown by a chain line "t" in FIG. 7) drawn into the mouth section 12 passes through the gaps "a", the back lid 32 cooperating with the front lid 28 during the rotation thereof does not interfere with the magnetic tape t. Therefore, the front lid 28 can be smoothly closed without any obstacles.

Further, in order to prevent interference between the magnetic tape t to be drawn into the mouth section 12 and the guide walls 39 of the lower half 3, the guide walls 39 are located at the positions such that their front ends are largely retracted from the front roller guides 6a and 6b, and there is defined a desired gap between the front end of each guide wall 39 and the front lid 28 under the closed condition thereof.

Further, a pair of right and left grooves 42 are formed at the rear edge of the recess 2a of the top wall of the upper half 2, so as to allow the escape of the arms 41 of the back lid 32 upon opening of the front lid 28.

The operation of the tape cassette as constructed above will now be described.

Under the normal or inoperative condition of the tape cassette, the tape reels 4 and 5 are disposed at the normal position as defined by the 8 mm video standard. In this normal position of the tape reels 4 and 5, the pawls 21a and 21b of the lock member 20 are engaged with the engagement grooves 22a and 22b of the reel retainers 8 and 9, and are also engaged with the engagement teeth 23a and 23b of the tape reels 4 and 5, respectively. Accordingly, the reel retainers 8 and 9 are locked in the normal position of the tape reels 4 and 5, and the tape reels 4 and 5 are also locked to be maintained in an irrotatable condition.

As mentioned above, the tape reels 4 and 5 are normally disposed in the normal position as defined by the 8 mm video standard. Therefore, the tape cassette in this preferred embodiment can be used like a general 8 mm video cassette without requiring the use of an adapter or the like.

In the case of loading this tape cassette into a standard recording/reproducing device designed in accordance with the 8 mm video standard, the first unlocking member provided in this recording/reproducing device as mentioned previously is inserted through the through hole 25 of the lower half 3 into the operation hole 20a of the lock member 20. Then, the lock member 20 is moved rearwardly by the first unlocking member against the biasing force of the compression coil spring 24. As a result, the pawls 21a and 21b of the lock member 20 are brought into disengagement from the engagement teeth 23a and 23b of the tape reels 4 and 5. Thus, the tape reels 4 and 5 are made rotatable (see FIG. 2).

As described above, in the case of applying this tape cassette to the standard recording/reproducing device, only the engaged condition of the pawls 21a and 21b of the lock member 20 with respect to the engagement teeth 23a and 23b of the tape reels 4 and 5 is changed, but the engaged condition of the pawls 21a and 21b with respect to the engagement grooves 22a and 22b of the reel retainers 8 and 9 is still maintained. That is, only the rotation locked condition of the tape reels 4 and 5 is released, but the original normal position of the tape reels 4 and 5 is maintained. Accordingly, this tape cassette can be operated in the standard recording/reproducing device in the same manner as a general 8 mm video cassette (i.e., this tape cassette is compatible with a general 8 mm video cassette).

On the other hand, in the case of loading the tape cassette of this preferred embodiment into a dedicated recording/reproducing device departing from the 8 mm video standard, the second unlocking member provided in this recording/reproducing device as mentioned previously is inserted through the recess 26 of the lower half 3, and the front end surface 20b of the lock member 20 is then urged rearwardly by the second unlocking member. Accordingly, the lock member 20 is moved rearwardly more than the previous case where the tape cassette is applied to the standard recording/reproducing device. As a result, the pawls 21a and 21b of the lock member 20 are brought into disengagement from not only the engagement teeth 23a and 23b of the tape reels 4 and 5 but also the engagement grooves 22a and 22b of the reel retainers 8 and 9. Thus, the tape reels 4 and 5 are made rotatable, and simultaneously the reel retainers 8 and 9 are also made swingable (see FIG. 3).

After the locked condition of the reel retainers 8 and 9 is released, the reel retainers 8 and 9 are swung rearwardly about the pivotal shafts 10 and 11 by means of a swinging mechanism (not shown) provided in the recording/reproducing device. In other words, the tape reels 4 and 5 retained by the reel retainers 8 and 9 are moved to the rear corner portions in the cassette case 1 as simultaneously with the swing motion of the reel retainers 8 and 9. Accordingly, the mouth section 12 is widely expanded (see FIG. 4).

Such expansion of the mouth section 12 enables a head drum 61 and a tape running unit 62 (inclusive of an impedance roller 63, tape guides 64, 65 and 66, loading posts 67 and 68, capstan 69, pinch roller 70, etc.) provided in the recording/reproducing device to be completely received into the mouth section 12 upon recording or reproducing.

A tape loading operation of the recording/reproducing device will be briefly described. The tape guides 64, 65 and 66, the loading posts 67 and 68, and the capstan 69 of the tape running unit 62 are provided on a body of the recording/reproducing device, and they are disposed in the mouth section 12 when the tape cassette is loaded. On the other hand, the head drum 61, the impedance roller 63, and the pinch roller 70 are provided on a movable plate (not shown) which is movable relative to the body of the recording/reproducing device, and they are disposed outside the mouth section 12 before the tape cassette is fully loaded. When the tape cassette is fully loaded into the recording/reproducing device, the movable plate is moved to insert the head drum 61, the impedance roller 63, and the pinch roller 70 from the front opening of the cassette case 1 into the mouth section 12. Accordingly, the magnetic tape T stretched between the roller guides 6a and 6b is drawn into the mouth section 12 to form a predetermined tape path. Simultaneously, the loading posts 67 and 68 are arcuately moved around the head drum 61 to wind the magnetic tape T around the head drum 61, thus ending the loading operation.

The above-mentioned loading operation is carried out under the open condition of the front lid 28, in which the front lid 28 is opened by a lid opening mechanism (not shown) provided in the recording/reproducing device upon loading of the tape cassette. However, since the whole of the head drum 61 and the tape running unit 62 is completely received in the mouth section 12 at the end of the loading operation, the front lid 28 can be closed again after ending the loading operation.

As mentioned above, the two gaps "a" for allowing passage of the magnetic tape T are formed at the right and left ends of the back lid 32. Therefore, the back lid 32 does not interfere with the magnetic tape T, and the front lid 28 can be closed smoothly and reliably without any troubles.

In the tape cassette as described above, the mouth section 12 can be widely expanded to enable the head drum 61 and the tape running unit 62 to be completely received in the mouth section 12 after ending of the loading operation. That is, all of the mechanism elements in the recording/reproducing device can be located in substantially the same area as the size of the tape cassette. Accordingly, the size of the recording/reproducing device can be made very compact like a so-called cassette size.

Furthermore, since the front lid 28 in this tape cassette can be closed after ending the loading operation, the thickness of the recording/reproducing device can be made small by an amount corresponding to a height of the front lid 28, thereby greatly contributing to further compactness of the recording/reproducing device.

Additionally, in this tape cassette, the roller guides 13a and 13b are rotatably mounted on the pivotal shafts 10 and 11 which constitute the centers of swing motion of the reel retainers 8 and 9, and the magnetic tape T is guided through the roller guides 13a and 13b to the front opening of the cassette case 1. Therefore, even when the reel retainers 8 and 9 are swung to move the respective positions of the tape reels 4 and 5, the magnetic tape T does not slacken. Accordingly, there is no possibility of defective running of the magnetic tape during the recording or reproducing operation.

Further, in this tape cassette, the roller guides 6a and 6b are provided at the left and right end portions of the front opening of the cassette case 1, and the two guide walls 39 located in the vicinity of the roller guides 6a and 6b are at the two positions largely retracted from the roller guides 6a and 6b. Therefore, the magnetic tape T can be smoothly drawn into the mouth section 12 without the need of the draw-out guides 60a and 60b used in the prior art upon loading of the tape cassette. As a result, the mechanism elements in the recording/reproducing device can be reduced in number to thereby bring further advantage for compact size of the recording/reproducing device.

Finally, in this tape cassette, the presser portions 16b and 17b of the reel presser springs 16 and 17 have a plane shape corresponding to the locus of movement of the tape reels 4 and 5, respectively. Therefore, a constant biasing force is applied from the reel presser springs 16 and 17 to the tape reels 4 and 5 at both the normal position shown in FIG. 1 and the retracted position shown in FIG. 4. Accordingly, constant stable rotation of the tape reels 4 and 5 can be obtained to ensure smooth running of the magnetic tape.

Figure 1:
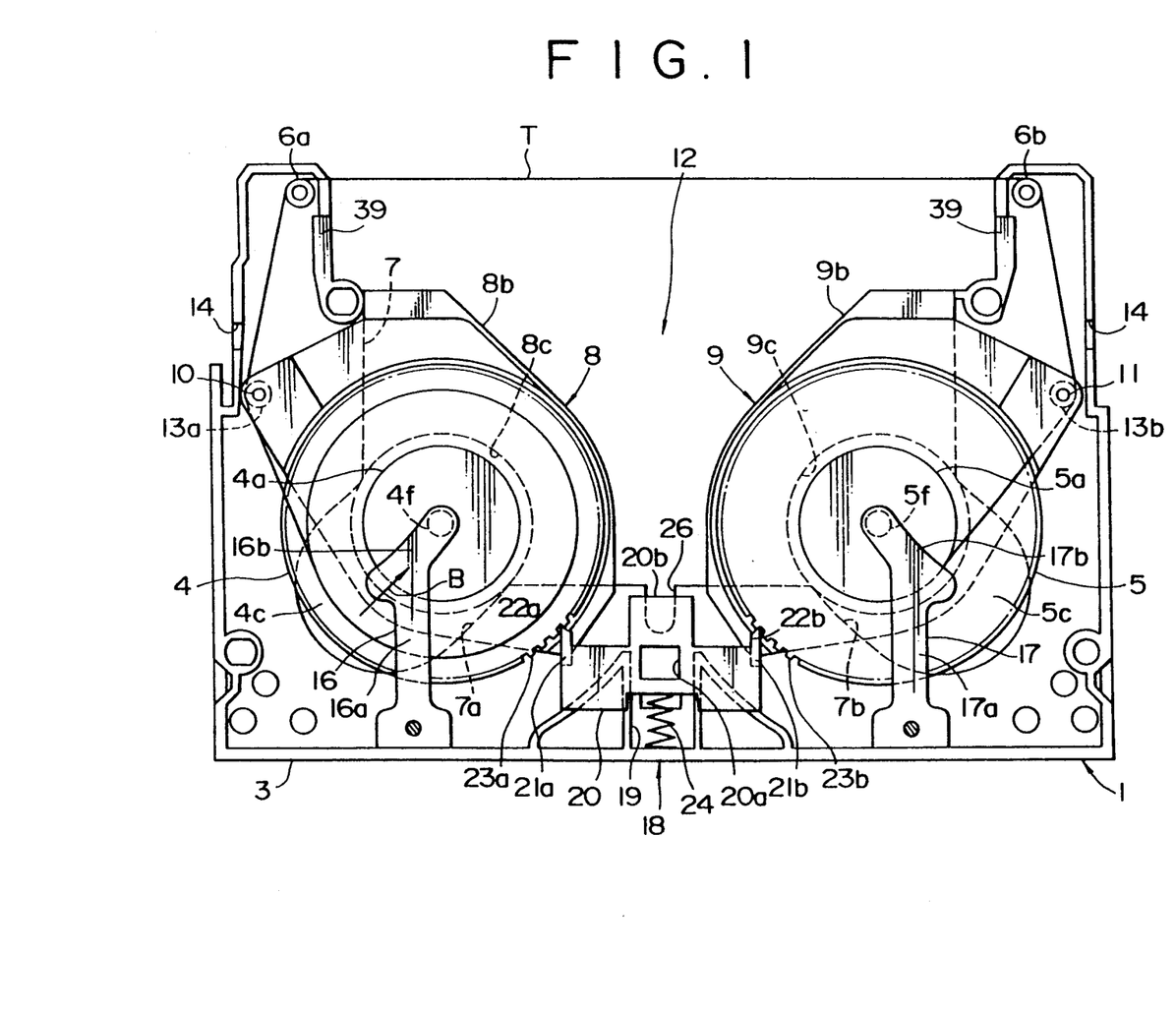
FIG. 1 is a top plan view of the tape cassette with an upper half thereof removed, showing a rotation and movement locked condition of the tape reels, according to a preferred embodiment of the present invention.
Figure 2:
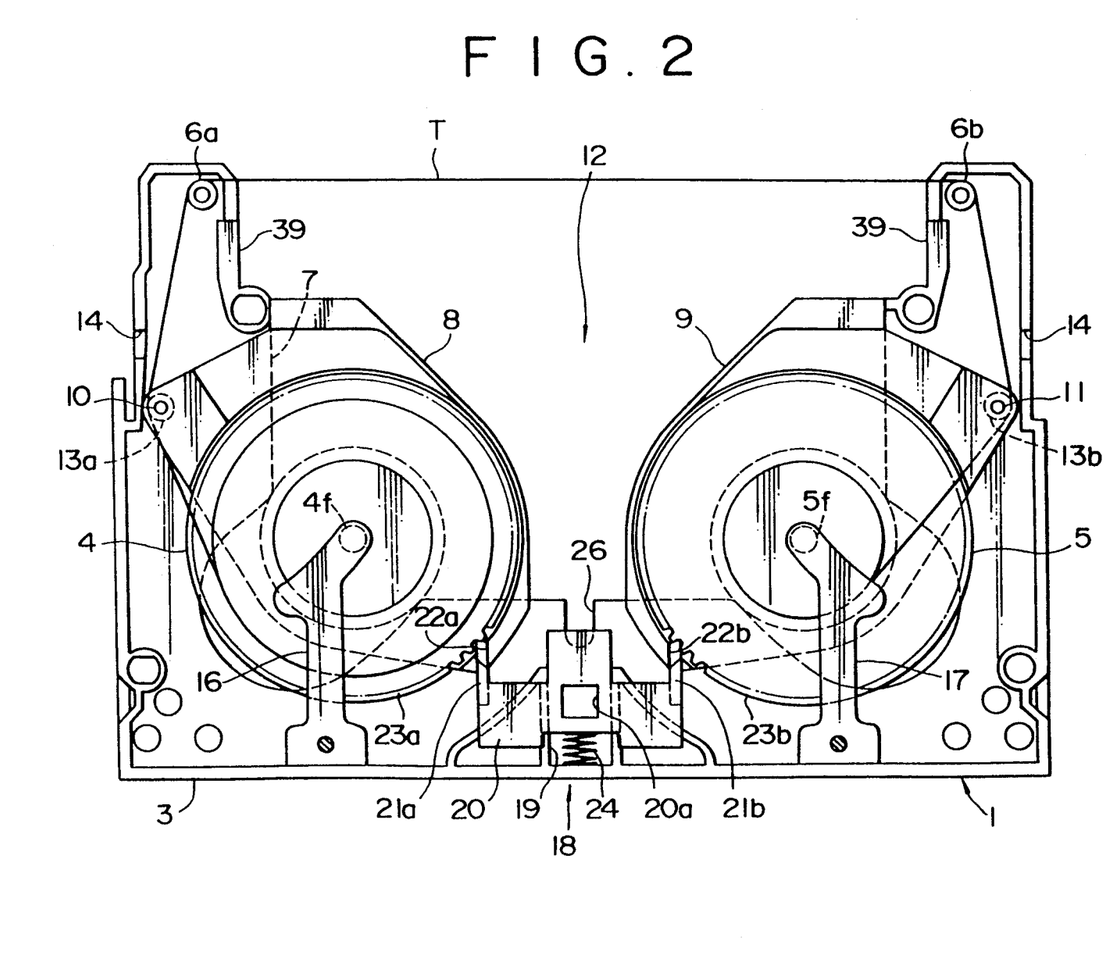
FIG. 2 is a view similar to FIG. 1, showing a rotation unlocked condition of the tape reels.
Figure 3:
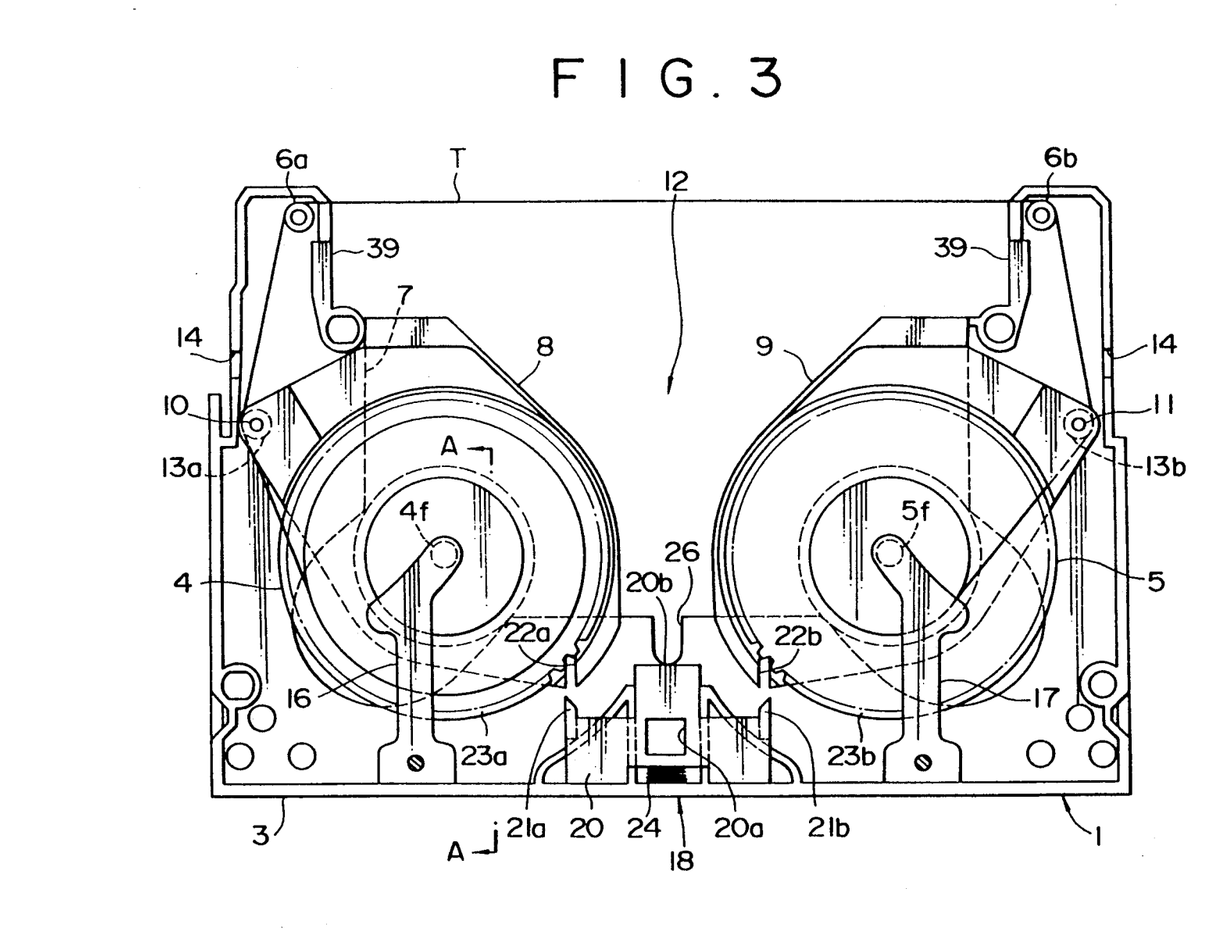
FIG. 3 is a view similar to FIG. 1, showing a movement unlocked condition of the tape reels.
Figure 4:
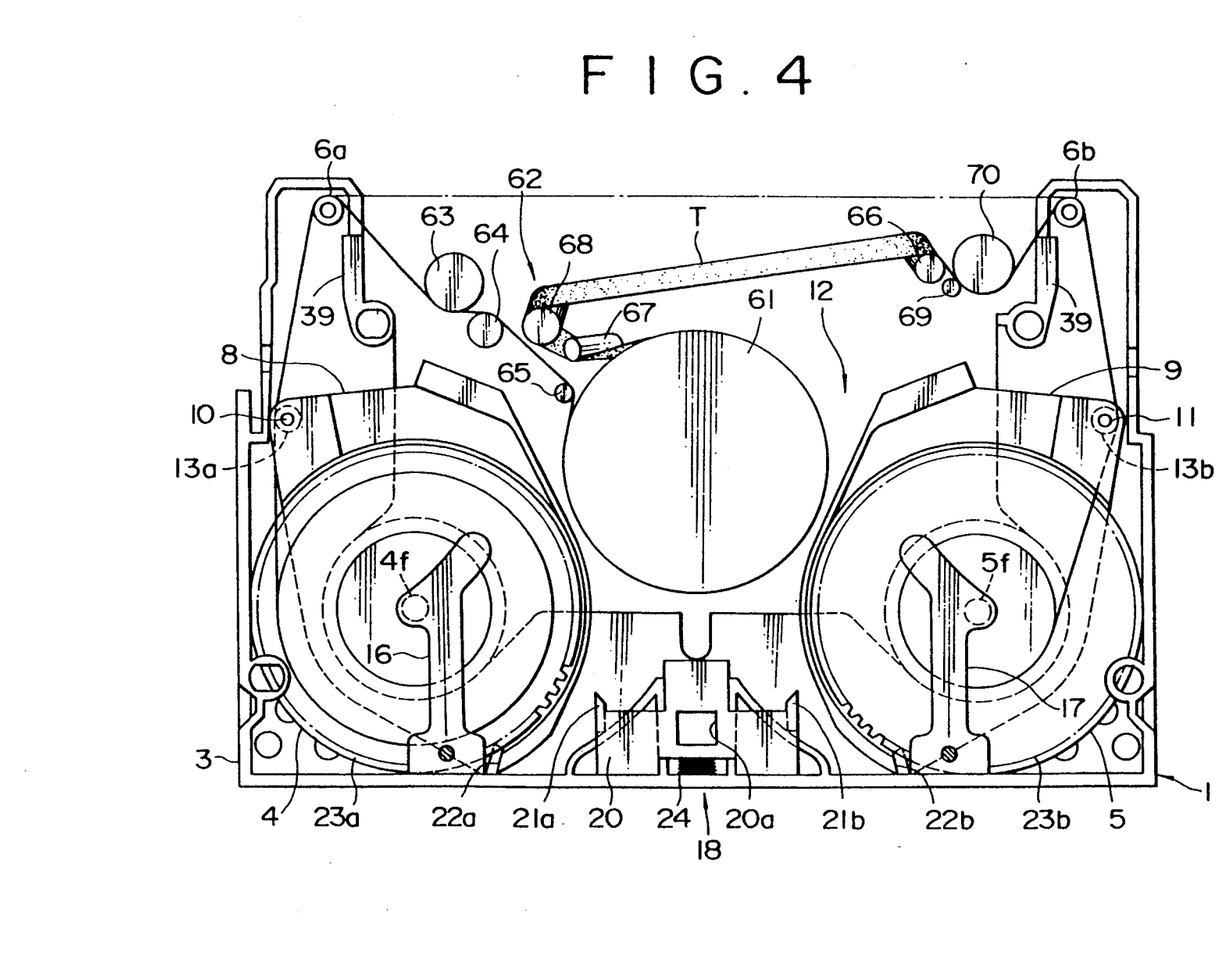
FIG. 4 is a view similar to FIG. 1, showing an expanded condition of the mouth section after ending of a loading operation.
Figure 5:
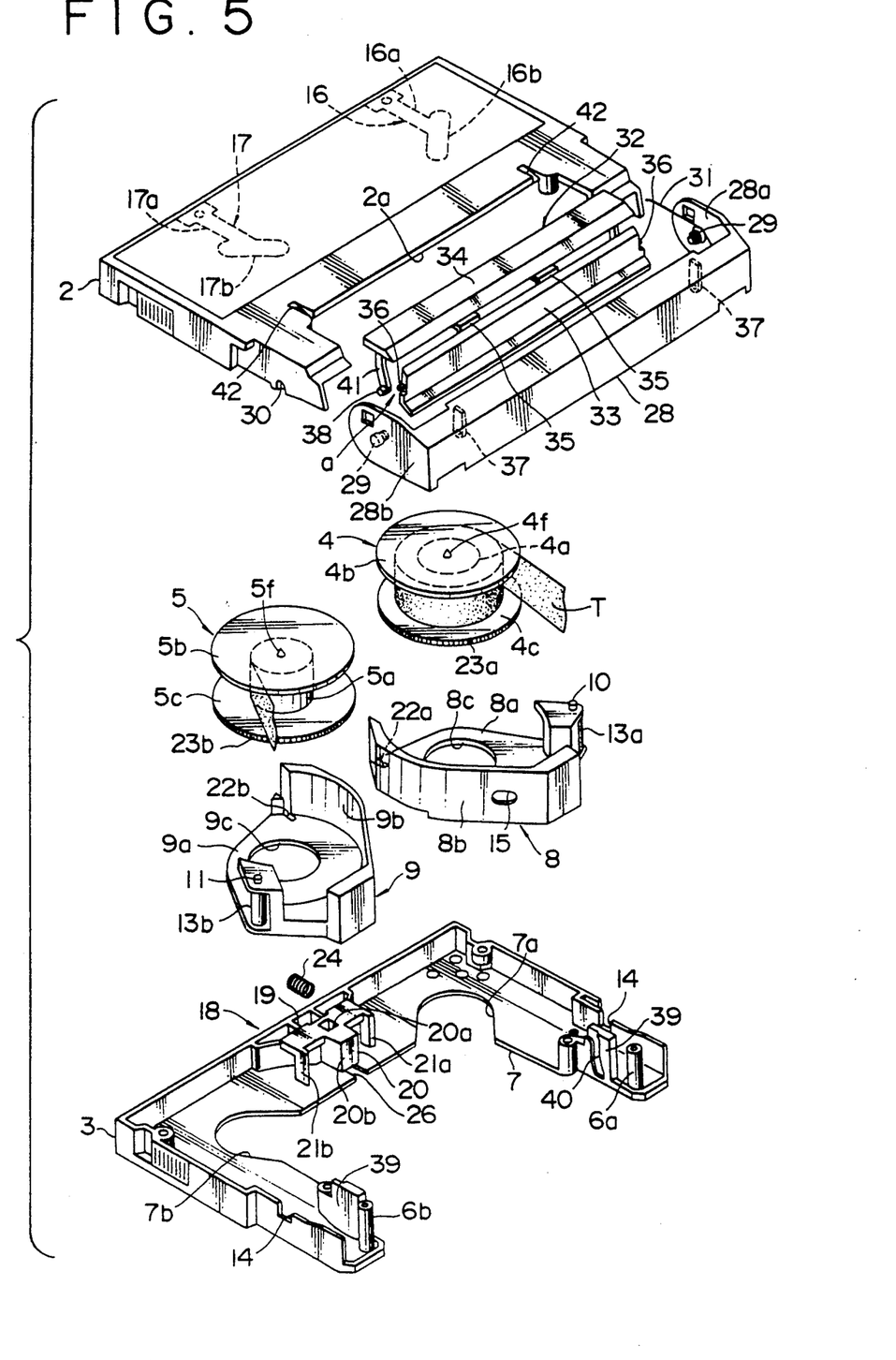
FIG. 5 is an exploded perspective view of the tape cassette.
Figure 6:
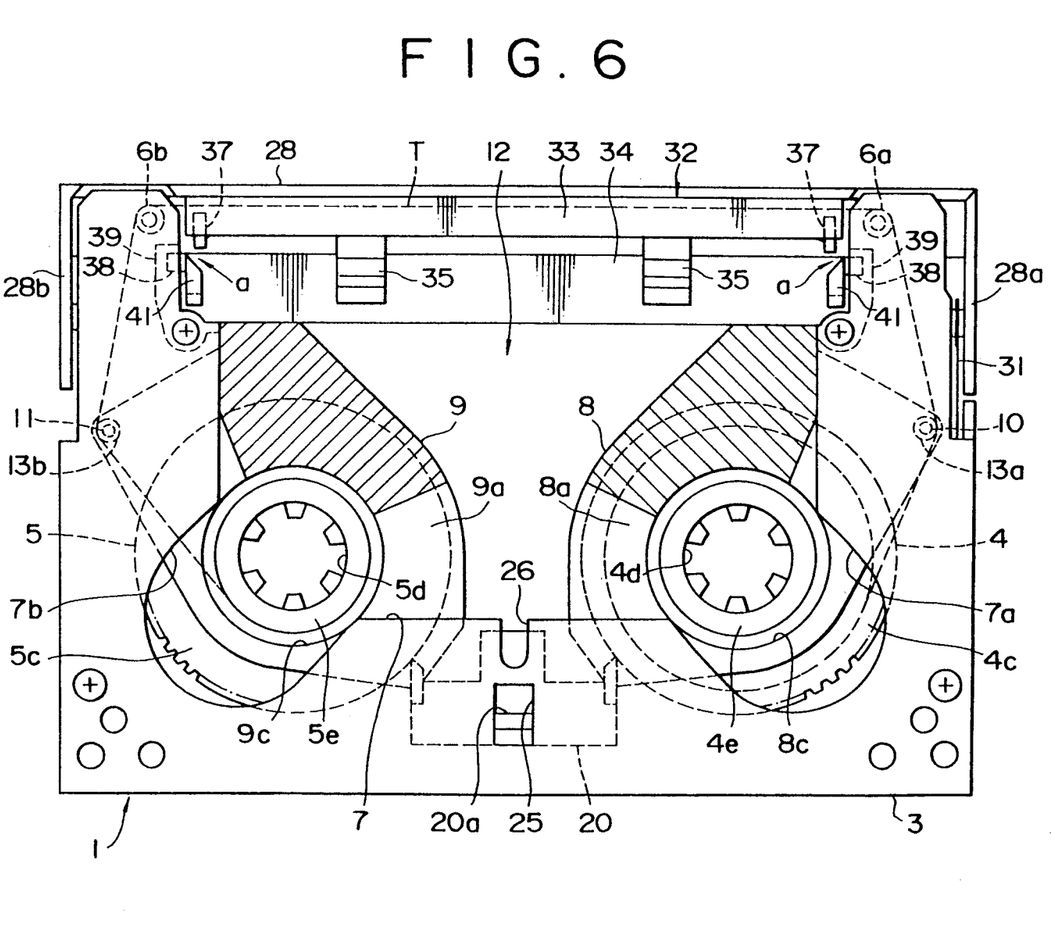
FIG. 6 is a bottom plan view of the tape cassette under the same condition as of FIG. 1.
Figure 7:
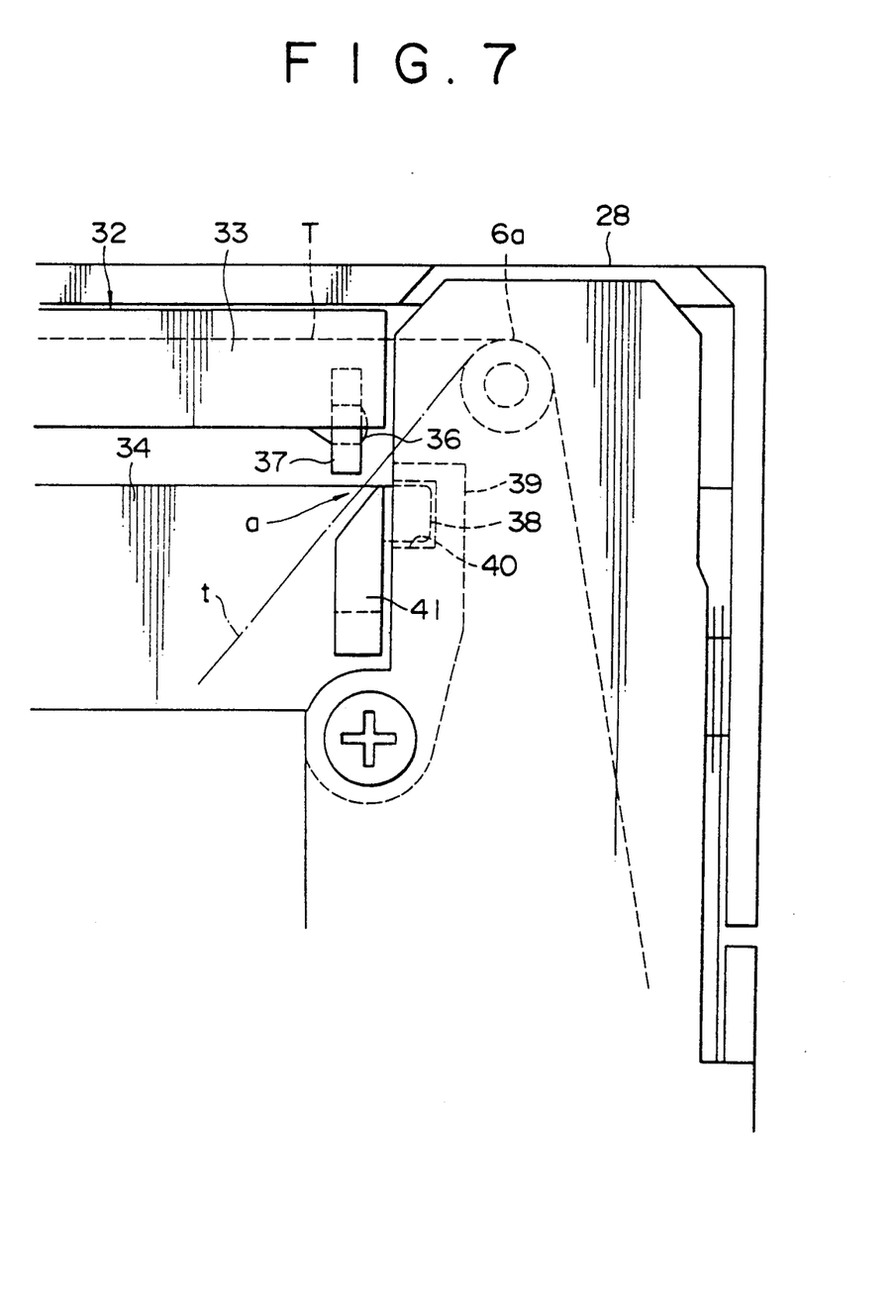
FIG. 7 is an enlarged view of an essential part shown in FIG. 6.
Figure 8:
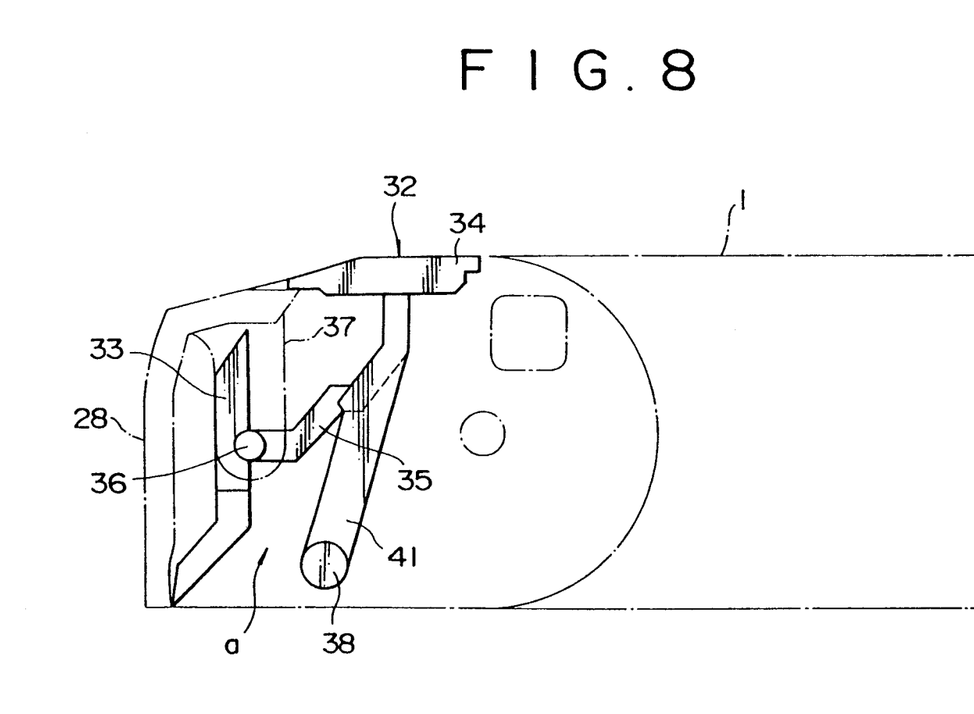
FIG. 8 is an enlarged side view of a back lid shown in FIG. 7.
Figure 9A:
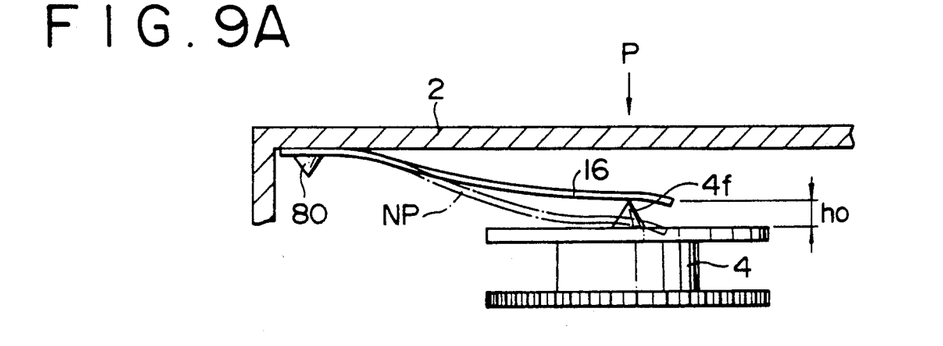
FIG. 9A is a cross section taken along the line A—A in FIG. 3, showing the operation of the reel presser spring under an inoperative condition of the tape cassette.

In the following, the sectional shape of the reel presser spring 16 along a thickness thereof will be discussed in detail with reference to FIGS. 9A to 9C, in which FIG. 9A is a cross section taken along the line A—A in FIG. 3. As will be apparent from FIGS. 9A to 9C, the sectional shape of the reel presser spring 16 is non-linear (substantially S-shaped), and the spring 16 is fixed at one end thereof to the upper half 2. That is, the spring 16 is formed at its one end with a hole (see FIG. 13), and a fixing member 80 such as resin is applied to the hole of the spring 16, thus fixing the spring 16 to the upper half 2. Although not shown, the reel presser spring 17 is similarly configured in a non-linear sectional shape.

FIG. 9A shows an inoperative condition where the tape cassette is not yet loaded into the recording/reproducing device. Under this condition shown in FIG. 9a, a free end portion of the spring 16 is maintained at a raised position higher by a vertical distance $h_0$ than a neutral position NP, where no external force is applied to the spring 16, by an upward force of the central projection 4f of the tape reel 4. In this case, the central position of the tape reel 4 coincides with an application point P where the biasing force of the spring 16 is applied.

Figure 9B:
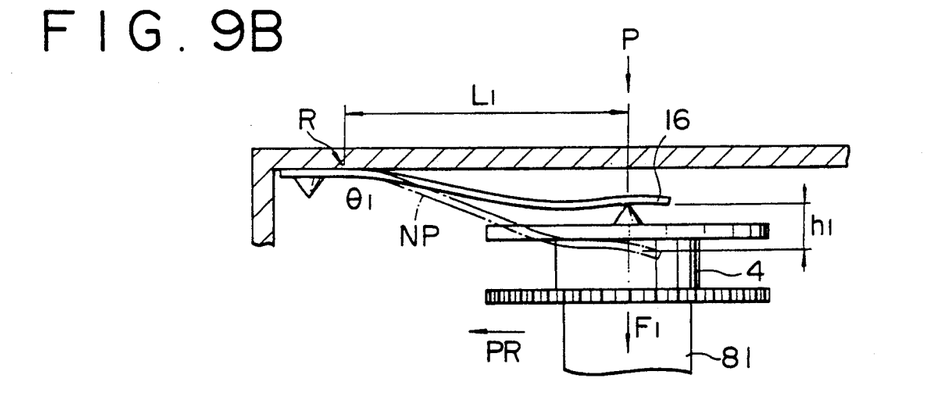
FIG. 9B is a view similar to FIG. 9A, showing the operation of the reel presser spring under an operative condition of the tape reels at a normal position thereof.

FIG. 9B shows an operative condition where the tape cassette is loaded into the recording/reproducing device in the normal position of the tape reel 4. That is, the tape reel 4 is raised by a rotational driving shaft 81 provided in the recording/reproducing device, so that a displacement of the spring 16 from the neutral position NP at the application point P becomes a vertical distance $h_1$. In this case, letting R denote a fulcrum point where the spring 16 starts separating from the upper half 2, and $L_1$ denote a horizontal distance from the fulcrum point R to the application point P, a swing angle $\theta_1$ of the spring 16 about the fulcrum point R from the neutral position NP is approximately expressed as $h_1/L_1$. To make the analysis simple, it is assumed that the spring 16 is swung only at the fulcrum point R, and that a moment $N_0\theta$ (where $N_0$ represents a constant; and $\theta$ represents a swing angle of the spring 16 about the fulcrum point R from the neutral position NP) is generated. In this case, letting $F_1$ denote a biasing force of the spring 16 against the tape reel 4 at the application point P, the following equation is given.

$$F_1 L_1 = N_0 \theta_1 = N_0 h_1 / L_1$$

Accordingly, the biasing force $F_1$ is expressed by the following equation.

$$F_1 = N_0 h_1 / (L_1)^2 \tag{1}$$

Thus, in the case that the recording/reproducing device is large in size, and has a sufficient internal space, the recording or reproducing operation can be carried out under the condition where the center of the tape reel 4 is maintained at the application point P.

Figure 9C:
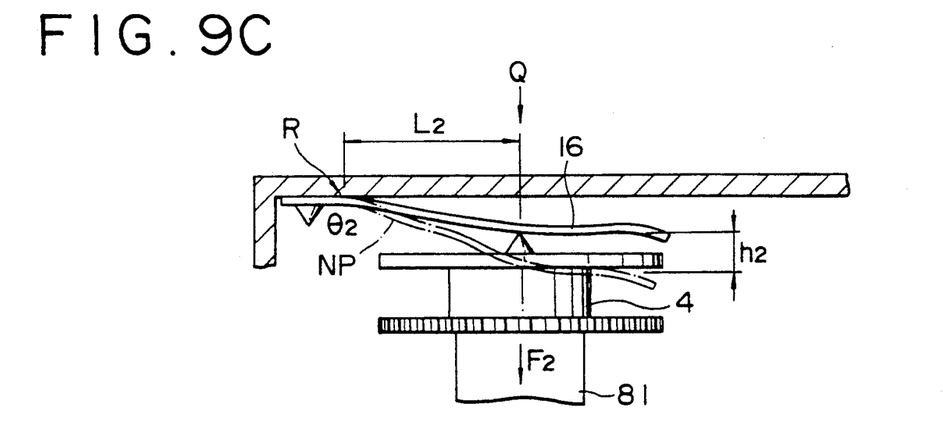
FIG. 9C is a view similar to FIG. 9A, showing the operation of the reel presser spring under another operative condition of the tape reels at a retracted position thereof.

In contrast, when the tape cassette is applied to a small-sized recording/reproducing device requiring expansion of the mouth section 12 of the tape cassette, the tape reel 4 is moved together with the rotational driving shaft 81 to the rear portion in the cassette case in a horizontal direction PR shown in FIG. 9B in parallel to the upper half 2, and the center of the tape reel 4 is fixed at an application point Q as shown in FIG. 9C. This condition shown in FIG. 9C corresponds to the retracted condition of the tape reels 4 and 5 shown in plan in FIG. 4. In this case, letting $L_2$ denote a horizontal distance between the application point Q and the fulcrum point R; $h_2$ denote a displacement of the spring 16 from the neutral position NP at the application point Q; $\theta_2$ denote a swing angle of the spring 16 about the fulcrum point R; and $F_2$ denote a biasing force of the spring 16 against the tape reel 4 at the application point Q, the following equation is given in the same manner as the previous case.

$$F_2 L_2 = N_0 \theta_2 = N_0 h_2 / L_2$$

Accordingly, the biasing force $F_2$ is expressed by the following equation.

$$F_2 = N_0 h_2 / (L_2)^2 \tag{2}$$

Thus, in the case that the recording or reproducing device is small in size, the recording or reproducing operation can be carried out under the condition where the center of the tape reel 4 is maintained at the application point Q.

In order to stabilize the rotation and the supporting of the tape reel 4 at both the application point P and the application point Q, it is necessary to set the biasing force $F_1$ at the application point P to be substantially equal to the biasing force $F_2$ at the application point Q. Accordingly, the condition for setting both the biasing forces $F_1$ and $F_2$ to be substantially equal to each other is given from the above equations (1) and (2) as follows:

$$h_1/(L_1)^2 = h_2/(L_2)^2 \tag{3}$$

In this preferred embodiment, the sectional shape of the reel presser spring 16 is set to a non-linear shape substantially satisfying the equation (3), thereby setting both the biasing forces at the application points P and Q to be substantially equal to each other.

However, since any portion of the reel presser spring 16 other than the fulcrum point R is also flexed, the condition of the expression (3) is an approximate condition in the strict sense. It is therefore necessary to finally decide the sectional shape of the reel presser spring 16 as taking experimental data or the like into consideration.

Figure 10:
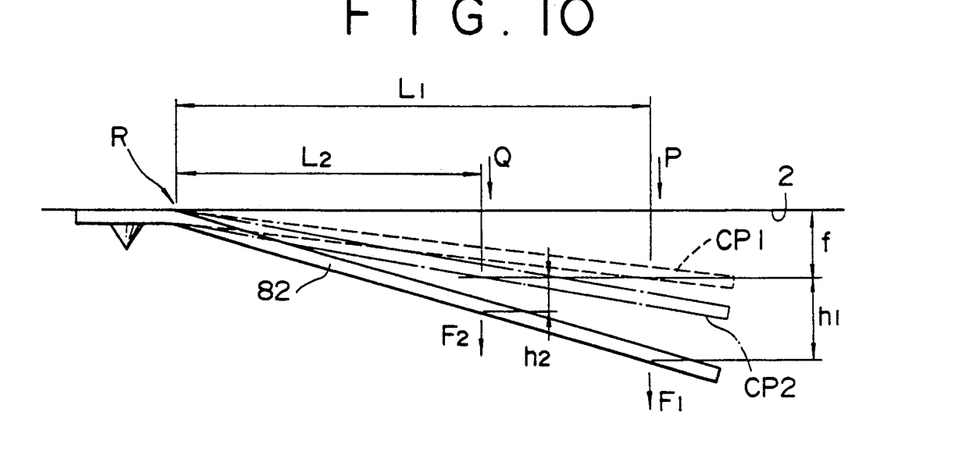
FIG. 10 is a view showing a linear sectional shape of the reel presser spring in a hypothetical case.

Thus, there will now be studied a sectional shape of the reel presser spring 16 satisfying the equation (3) to theoretically define the sectional shape. First, as shown in FIG. 10, considering a reel presser spring 82 having a linear sectional shape at its swing portion, the biasing force $F_1$ at the application point P and the biasing force $F_2$ at the application point Q will now be obtained. In this case, letting $CP_1$ and $CP_2$ denote respective positions of the spring 82 at the application points P and Q; f denote a distance between the central projection 4f of the tape reel 4 and the upper half 2 (see FIG. 9A) at both the application points P and Q; and $\theta_0$ denote an angle between the swing portion of the spring 82 and the upper half 2 under the condition where the spring 82 is in a neutral position $CP_3$, the following equations are approximately given.

$$h_1 = L_1\theta_0 - f;\ h_2 = L_2\theta_2 - f \tag{4}$$

By substituting the equation (4) into the equations (1) and (2), the biasing forces $F_1$ and $F_2$ can be expressed as follows:

$$F_1 = N_0(L_1\theta_0 - f)/(L_1)^2 \tag{5}$$

$$F_2 = N_0(L_2\theta_0 - f)/(L_2)^2 \tag{6}$$

Supposing f=0, that is, supposing that the reel presser spring 82 is urged upwardly to substantially contact the upper half 2, the equations (5) and (6) may be simplified as follows:

$$F_1 = N_0\theta_0/L_1 \tag{5A}$$

$$F_2 = N_0\theta_0/L_2 \tag{6A}$$

Figure 11:
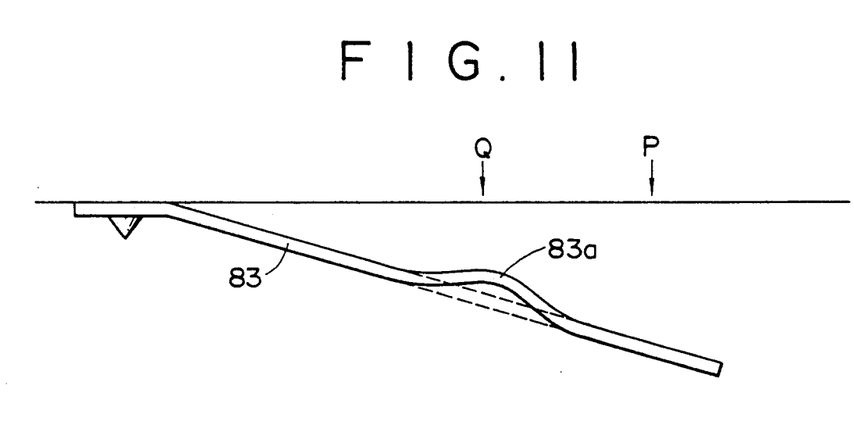
FIG. 11 is a view showing a non-linear sectional shape of the reel presser spring in one example according to the present invention.

Since $L_2 < L_1$ is supposed in this case, it is apparent from the equations (5A) and (6A) that $F_2 > F_1$ holds in the case of f=0. Accordingly, in order to satisfy the equality of $F_2 = F_1$, it is necessary to decrease the displacement $h_2$ in the equation (2). To this end, it is understood that the sectional shape of a reel presser spring as denoted by 83 in FIG. 11 is to be made convex toward the upper half 2 in the vicinity 83a of the application point Q.

In another case, supposing $f = L_1\theta_0/2$ and $L_2 = 2L_1/3$, the equations (5) and (6) can be simplified as follows:

$$F_1 = N_0\theta_0/(2L_1) \tag{5B}$$

$$F_2 = 3N_0\theta_0/(8L_1) \tag{6B}$$

Figure 12:
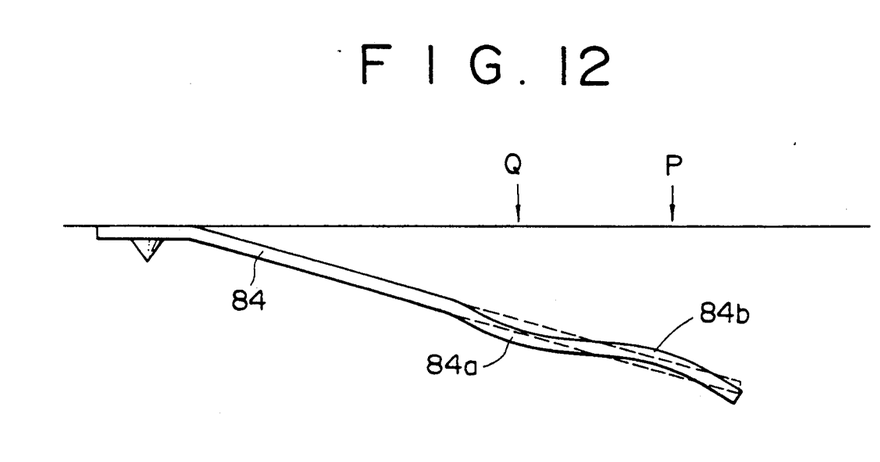
FIG. 12 is a view similar to FIG. 11, showing another example according to the present invention.
Figure 13:
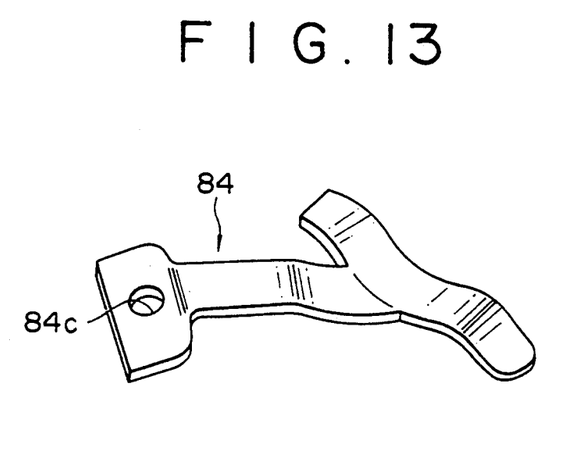
FIG. 13 is a perspective view of the reel presser spring shown in FIG. 12.

It is apparent from the equations (5B) and (6B) that $F_2 < F_1$ holds in this case. Thus, the result in this case is reversed to the result in the previous case of f=0. Accordingly, in order to satisfy the equality of $F_2 = F_1$, it is necessary to decrease the displacement $h_1$ in the equation (1) and increase the displacement $h_2$ in the equation (2). To this end, it is understood that the sectional shape of a reel presser spring as denoted by 84 in FIG. 12 is to be made convex toward the upper half 2 in the vicinity 84b of the application point P and convex toward the lower half 3 in the vicinity 84a of the application point Q. FIG. 13 shows this reel presser spring 84 in perspective. In FIG. 13, reference numeral 84c designates a hole to be used for fixing the spring 84 to the upper half 2.

While the equality of $F_2 = F_1$ can be satisfied with the linear sectional shape of the spring maintained by suitably setting the value of f, the equality of $F_2 = F_1$ is easily satisfied by modifying the sectional shape of the spring in general.

Thus, it is understood that the sectional shape of the reel presser spring should be modified according to a degree of lifting of the spring toward the upper half.

Figure 14:
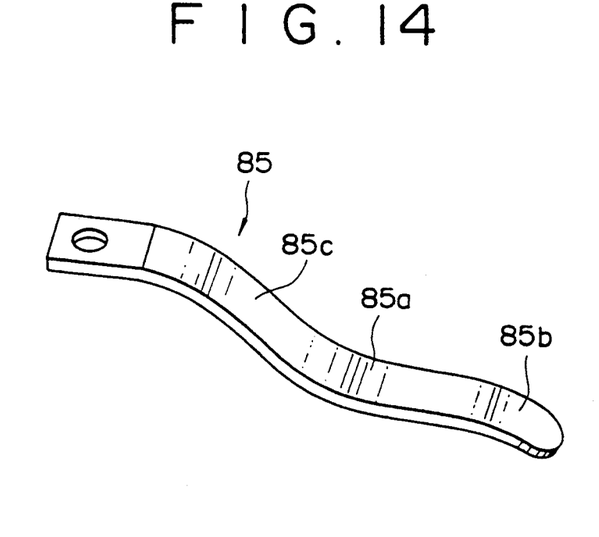
FIG. 14 is a view similar to FIG. 13, showing another example according to the present invention.

Further, as shown in FIG. 14, the reel presser spring to be used in the present invention may be a leaf spring 85 having a linear plane shape and a non-linear sectional shape. In this leaf spring 85, three application points are supposed, and the sectional shape is therefore non-linear in the vicinities 85a, 85b and 85c of the three application points. In the case of employing this leaf spring 85 in the tape cassette of the present invention, two leaf springs 85 may be arranged along the directions as depicted by arrows B and B' in FIG. 1. Alternatively, the right and left leaf springs 85 may be arranged in parallel to each other.

Having thus described the present invention applied to an 8 mm video cassette by way of example, it is to be noted that the present invention is not limited to the 8 mm video cassette but may be applied to various tape cassettes of the recording type employing a rotary head, such as ½ inch video cassette and DAT (digital audio tape recorder) cassette which are commercially available at present.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A tape cassette comprising:
   a cassette case;
   a pair of rotatable tape reels accommodated in said cassette case for winding a magnetic tape therearound, said tape reels having a diameter;
   a mouth section formed between and in front of said tape reels in said cassette case for receiving a head drum of a recording/reproducing device;
   means for allowing swinging movement of said tape reels to a rear portion of said cassette, whereby when said tape cassette is loaded into said recording/reproducing device, said tape reels are moved to the rear portion of said cassette case, thereby expanding said mouth section; and
   a spring for biasing said tape reels, said spring having a substantially S-shaped cross section, so as to provide a biasing force of said spring against said tape reels before swinging movement of said tape reels substantially equal to the biasing force after swinging movement of said tape reels;
   wherein said means for allowing swinging movement of said tape reels comprises a pair of reel retainers for rotatably retaining said tape reels, a pair of pivot shafts provided on an inner surface of said cassette case for respectively pivotably supporting said reel retainers for swinging motion, and a pair of recesses formed through a lower wall of said cassette case for respectively receiving said reel retainers following said swinging motion of said tape reels.

2. The tape cassette as defined in claim 1, wherein each of said recesses has a shape tracing a locus of the swinging motion of each said reel retainers.

3. The tape cassette as defined in claim 1 further comprising a pair of roller guides rotatably mounted on said pivot shafts for maintaining substantially constant tension of said magnetic tape independently of the movement of said tape reels.

4. A tape cassette comprising:
   a cassette case;
   a pair of rotatable tape reels accommodated in said cassette case for winding a magnetic tape therearound, said tape reels having a diameter;
   a mouth section formed between and in front of said tape reels in said cassette case for receiving a head drum of a recording/reproducing device;
   means for allowing swinging movement of said tape reels to a rear portion of said cassette, whereby when said tape cassette is loaded into said recording/reproducing device, said tape reels are moved to the rear portion of said cassette case, thereby expanding said mouth section; and
   a spring for biasing said tape reels, said spring having a substantially S-shaped cross section, so as to provide a biasing force of said spring against said tape reels before swinging movement of said tape reels substantially equal to the biasing force after swinging movement of said tape reels;
   wherein said spring comprises a pair of leaf springs each consisting of an arm portion fixed at its base end to an upper wall of said cassette case, and a presser portion continued from a front end of said arm portion for pressing a central portion of each of said tape reels, said presser portion having an arcuate plane shape tracing a locus of the movement of each of said tape reels.

5. The tape cassette as defined in claim 4, wherein a cross-sectional form of said presser portion of each of said pair of leaf springs is convex toward the upper wall of said cassette case in the vicinity of a point of application of said biasing force to said tape reels following movement of said tape reels.

6. The tape cassette as defined in claim 4, wherein a cross-sectional form of said presser portion of each of said pair of leaf springs is convex toward the upper wall of said cassette case in the vicinity of a point of application of said biasing force to said tape reels before movement of said tape reels, and is convex in cross-sectional form toward the lower wall of said cassette case in the vicinity of a point of application of said biasing force to said tape reels following movement of said tape reels.

7. The tape cassette case as defined in claim 4, wherein each said leaf spring has a linear plan shape and a non-linear cross-sectional shape.

8. A tape cassette comprising:
   a cassette case;
   a pair of rotatable tape reels accommodated in said cassette case for winding a magnetic tape therearound, said tape reels having a diameter;
   a mouth section formed between and in front of said tape reels in said cassette case for receiving a head drum of a recording/reproducing device;
   means for allowing swinging movement of said tape reels to a rear portion of said cassette, whereby when said tape cassette is loaded into said recording/reproducing device, said tape reels are moved to the rear portion of said cassette case, thereby expanding said mouth section; and
   a spring for biasing said tape reels, said spring having a substantially S-shaped cross section, so as to provide a biasing force of said spring against said tape reels before swinging movement of said tape reels substantially equal to the biasing force after swinging movement of said tape reels;
   further comprising a front lid rotatably mounted to said cassette case for protecting a front surface of said magnetic tape stretched between said roller guides, and a back lid supported to said front lid so as to be rotatable in associate with said front lid;
   wherein said front lid and said back lid are adapted to be closed after said tape cassette is loaded into said recording/reproducing device.

* * * * *